(12) United States Patent
Ding et al.

(10) Patent No.: US 11,801,600 B1
(45) Date of Patent: Oct. 31, 2023

(54) TERMINAL FORCE SOFT-SENSING METHOD OF HYDRAULIC MANIPULATOR

(71) Applicants: EAST CHINA JIAOTONG UNIVERSITY, Jiangxi (CN); CHONGQING UNIVERSITY, Chongqing (CN)

(72) Inventors: Ruqi Ding, Nanchang (CN); Feng Li, Nanchang (CN); Min Cheng, Chongqing (CN); Gang Li, Nanchang (CN); Xueshan Mu, Nanchang (CN); Guoliang Hu, Nanchang (CN)

(73) Assignees: EAST CHINA JIAOTONG UNIVERSITY, Nanchang (CN); CHONGQING UNIVERSITY, Chongqing (CN)

( * ) Notice: Subject to any disclaimer, the term of this patent is extended or adjusted under 35 U.S.C. 154(b) by 0 days.

(21) Appl. No.: 18/349,077

(22) Filed: Jul. 7, 2023

Related U.S. Application Data

(63) Continuation-in-part of application No. PCT/CN2022/090298, filed on Apr. 29, 2022.

(30) Foreign Application Priority Data

Oct. 26, 2021 (CN) .......................... 202111246682.0

(51) Int. Cl.
 *B25J 9/16* (2006.01)
(52) U.S. Cl.
 CPC ........... *B25J 9/1607* (2013.01); *B25J 9/1605* (2013.01); *B25J 9/1633* (2013.01)
(58) Field of Classification Search
 CPC ....... B25J 9/1607; B25J 9/1605; B25J 9/1633
 See application file for complete search history.

(56) References Cited

U.S. PATENT DOCUMENTS

| | | | |
|---|---|---|---|
| 2006/0116783 | A1 | 6/2006 | Aghili et al. |
| 2020/0157775 | A1 | 5/2020 | Sawodny et al. |

FOREIGN PATENT DOCUMENTS

| | | |
|---|---|---|
| CN | 106064377 A | 11/2016 |
| CN | 107391861 A | 11/2017 |

(Continued)

OTHER PUBLICATIONS

First Office Action in Chinese Application No. 202111246682.0 dated Jun. 30, 2022, 19 pages.

(Continued)

*Primary Examiner* — Basil T. Jos
(74) *Attorney, Agent, or Firm* — METIS IP LLC

(57) ABSTRACT

The embodiments of the present disclosure provide a terminal force soft-sensing method of a hydraulic manipulator. The method includes: establishing a dynamic model of the hydraulic manipulator, performing linearization processing on the dynamic model, and establishing a minimum inertial parameter set of the hydraulic manipulator and a linear model of a regression matrix corresponding to the minimum inertial parameter set; generating an excitation trajectory by solving a finite Fourier series coefficient; determining a hydraulic driving torque by collected values of pressure sensors of two chambers of hydraulic cylinders when controlling the hydraulic manipulator to operate the excitation trajectory under a no-load condition; determining a total regression matrix by bringing joint angles, joint angular velocities, and joint angular accelerations at each moment into the regression matrix; and determining dynamic parameters of the hydraulic manipulator based on the hydraulic driving torque and the regression matrix.

8 Claims, 11 Drawing Sheets

(56) References Cited

FOREIGN PATENT DOCUMENTS

| CN | 107671861 | A | | 2/2018 | |
|----|-----------|---|---|--------|---|
| CN | 107703747 | A | | 2/2018 | |
| CN | 109514602 | A | | 3/2019 | |
| CN | 112327630 | A | | 2/2021 | |
| CN | 112743541 | A | | 5/2021 | |
| CN | 113172621 | A | | 7/2021 | |
| CN | 113325716 | A | * | 8/2021 | ........... G05B 13/042 |
| CN | 113977578 | A | | 1/2022 | |

OTHER PUBLICATIONS

Ding, Ruqi et al., Advanced Energy Management of a Novel Independent Metering Meter Out Control System A Case Study of an Excavator, IEEE Access, 6: 45782-45795, 2018.

Janne Koivumäki et al., Stability-Guaranteed Force-Sensorless Contact Force/Motion Control of Heavy-Duty Hydraulic Manipulators, IEEE Transactions on Robotics, 31(4): 918-935, 2015.

Gijo Sebastian et al., Interaction Force Estimation Using Extended State Observers: An Application to Impedance-Based Assistive and Rehabilitation Robotics, IEEE Robotics and Automation Letters, 4(2): 1156-1161, 2019.

Lionel Hulttinen et al., Parameter Identification for Improved Performance of Model-Based Control of Hydraulic Manipulators, IEEE Conference on Cybernetics and Intelligent Systems and Robotics, 124-129, 2019.

Shahram Tafazoli et al., Identification of Inertial and Friction Parameters for Excavator Arms, IEEE Transactions on Robotics and Automation, 15(5): 966-971, 1999.

Alexander Laray et al., The Identification Method of Robot Actuator Parameters, 15th International Conference on Control, Automation and Systems, 1624-1628, 2015.

Jin, Jingfu et al., Parameter Identification for Industrial Robots with a Fast and Robust Trajectory Design Approach, Robotics and Computer-Integrated Manufacturing, 31: 21-29, 2015.

Jiang, Surong et al., A Typical Dynamic Parameter Identification Method of 6-Degree-of-Freedom Industrial Robot, Journal of Systems and Control Engineering, 2017, 13 pages.

Ge, Weimin et al., Dynamic Parameter Identification for Reconfigurable Robot Using Adaline Neural Network, IEEE International Conference on Mechatronics and Automation, 319-324, 2019.

Takuma Katsumata et al., Optimal Exciting Motion for Fast Robot Identification. Application to Contact Painting Tasks with Estimated External Forces, Robotics and Autonomous Systems, 113: 149-159, 2019.

Wu, Wenxiang et al., Dynamic Identification for Robot Manipulators Based on Modified Fourier Series, Journal of Zhejiang University ( Engineering Science) , 47(2): 231-237, 2013.

Yan, Jun et al., 2-DOF Dynamic Parameters Identification for Hydraulic Excavator Arm, Transactions of the Chinese Society for Agricultural Machinery, 44(2): 17-21, 2013.

International Search Report in PCT/CN2022/090298 dated Jul. 5, 2022, 6 pages.

Written Opinion in PCT/CN2022/090298 dated Jul. 5, 2022, 12 pages.

* cited by examiner

TERMINAL FORCE SOFT-SENSING METHOD OF HYDRAULIC MANIPULATOR

CROSS-REFERENCE TO RELATED APPLICATIONS

This application is a Continuation-in-part of International Application No. PCT/CN2022/090298, filed on Apr. 29, 2022, which claims priority to Chinese Patent Application No. 202111246682.0, filed on Oct. 26, 2021, the entire contents of each of which are hereby incorporated by reference.

TECHNICAL FIELD

The present disclosure relates to the technical field of hydraulic manipulator control technology, and in particular, to a terminal force soft-sensing method of a hydraulic manipulator.

BACKGROUND

At present, hydraulic manipulators are widely used in product processing, construction rescue, underwater operations, etc. When a hydraulic manipulator is working under a heavy load, large inertia inevitably leads to a large impact, causing damage to a terminal sensor easily, which may further cause the hydraulic manipulator not to have a precise perception of a terminal force. To solve the above problem, a terminal force soft-sensing method of a hydraulic manipulator is provided, to replace a force sensor with the soft-sensing method, which can realize the precise perception of the terminal force.

At present, a direct external force estimation method based on an inverse kinematics model of a manipulator (Koivumki J; Mattila J. *Stability-Guaranteed Force-Sensorless Contact Force/Motion Control of Heavy-Duty Hydraulic Manipulators. IEEE Transactions on Robotics,* 2015) is widely used in a force soft sensing, but this method requires accurate dynamic parameters of the manipulator and estimation performance of an external force is affected due to the inability to obtain the accurate dynamic parameters. Another method is to realize the estimation of the external force by designing observers. In a letter (Sebastian G. *Interaction force estimation using extended state observers: An application to impedance-based assistive and rehabilitation robotics, IEEE Robotics and Automation Letters,* 2019), an Extended State Observer (ESO) is designed for estimating the external force. However, this method is limited to estimating constant or slowly changing interaction forces, and for assisted training in rehabilitation exercises, it will fail in high dynamic operating conditions of the hydraulic manipulator.

For this reason, the embodiments of the present disclosure provide a terminal force soft-sensing method of a hydraulic manipulator. By establishing a dynamic model of the hydraulic manipulator, and then establishing a minimum inertia parameter set model of the hydraulic manipulator, an excitation trajectory is solved by using finite Fourier series. Under the excitation trajectory, a minimum inertial parameter set model is used to solve the dynamic parameters of the hydraulic manipulator, and then calculate an external force.

SUMMARY

One or more embodiments of the present disclosure provide a terminal force soft-sensing method of a hydraulic manipulator. The method is executed by a processor, including: step 1, establishing a dynamic model of the hydraulic manipulator, performing linearization processing on the dynamic model, and establishing a minimum inertial parameter set of the hydraulic manipulator and a linear model of a regression matrix corresponding to the minimum inertial parameter set; step 2, generating an excitation trajectory by solving a finite Fourier series coefficient through taking a condition count of the regression matrix in the step 1 minimal as a goal; step 3, determining a hydraulic driving torque r by collected values of pressure sensors of two chambers of hydraulic cylinders when controlling the hydraulic manipulator to operate the excitation trajectory under a no-load condition; and determining a total regression matrix by bringing joint angles, joint angular velocities, and joint angular accelerations at each moment into the regression matrix; step 4, determining dynamic parameters of the hydraulic manipulator according to the hydraulic driving torque r obtained in the step 3 and the regression matrix; and step 5, determining the terminal force of the hydraulic manipulator based on the dynamic parameters of the hydraulic manipulator determined in the step 4 and the linear model in the step 1.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same number indicates the same structure, wherein.

DETAILED DESCRIPTION

Figure 1:
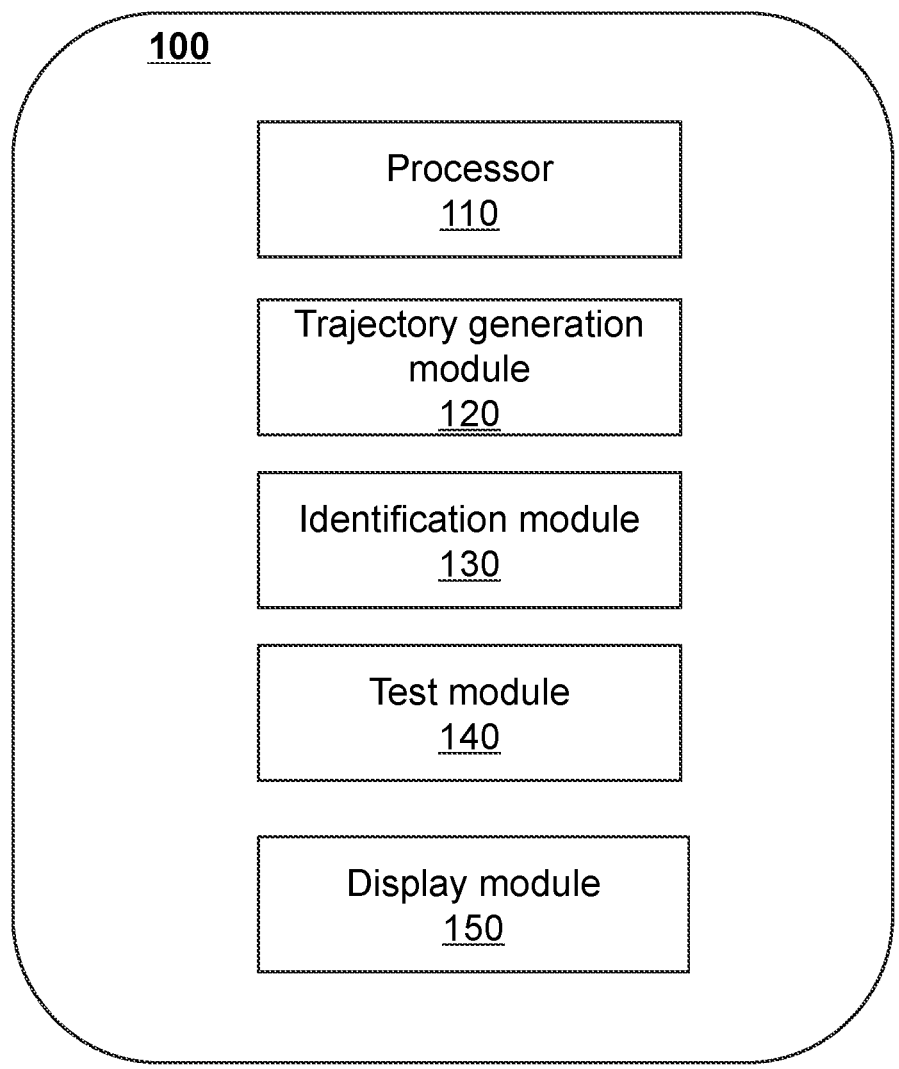
FIG. 1 is an exemplary module diagram illustrating a terminal force soft-sensing system of a hydraulic manipulator according to some embodiments of the present disclosure.

To illustrate the technical solutions of the embodiments of the present disclosure more clearly, the following will briefly introduce the drawings that need to be used in the description of the embodiments. Obviously, the drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit" and/or "module" used in the present disclosure are a method used to distinguish different components, elements, parts, portions, or assemblies of different levels. However, if other words serve the same purpose, the words may be replaced by other expressions.

As used in the disclosure and the appended claims, the singular forms "a," "an," and "the" include plural referents unless the content clearly dictates otherwise; the plural forms may be intended to include singular forms as well. In general, the terms "comprise" and "include" imply the inclusion only of clearly identified steps and elements that do not constitute an exclusive listing. A method or equipment may also include other steps or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. At the same time, other operations may also be added to these processes, or from these processes to remove a certain step or several steps.

FIG. 1 is an exemplary module diagram illustrating a terminal force soft-sensing system of a hydraulic manipulator according to some embodiments of the present disclosure. As shown in FIG. 1, the terminal force soft-sensing system 100 of the hydraulic manipulator (hereinafter referred to as the soft-sensing system 100) may include a processor 110, a trajectory generation module 120, an identification module 130, a test module 140, and a display module 150.

The processor 110 may process data and/or information obtained from other devices or system components, and based on the data, the information, and/or processing results, a terminal force soft-sensing method of a hydraulic manipulator shown in some embodiments of the present disclosure is executed to complete one or more functions described in some embodiments of the present disclosure. For example, the processor 110 may control the trajectory generation module 120 to generate at least one excitation trajectory. As another example, the processor 110 may complete the identification of dynamic parameters based on the excitation trajectory, and perform the terminal force soft-sensing under different trajectories based on identified dynamic parameters. Different trajectories may be preset, such as a straight trajectory, a triangle trajectory, an ellipse trajectory, etc.

In some embodiments, the processor 110 may include one or more processing engines (e.g., single-chip processing engines or multi-chip processing engines). Merely by way of example, the processor 110 may include a central processing unit (CPU), an application-specific integrated circuit (ASIC), etc., or any combination thereof.

The trajectory generation module 120 may be configured to generate trajectories for the terminal force soft sensing of the hydraulic manipulator. In some embodiments, the trajectory generated by the trajectory generation module 120 includes at least one excitation trajectory, and may also include a plurality of other different trajectories used for the terminal force soft sensing of the hydraulic manipulator.

The identification module 130 may be configured to perform the identification of the dynamic parameters of the hydraulic manipulator based on the excitation trajectory. For example, the identification module 130 may identify the dynamic parameters of the hydraulic manipulator when it is operating according to the excitation trajectory. The dynamic parameters obtained by identifying the excitation trajectory may be used to measure the terminal forces of the hydraulic manipulator on other trajectories.

The test module 140 may be configured to perform at least one round of soft-sensing on the hydraulic manipulator using at least one other trajectory (which is a non-excitation trajectory) generated based on the trajectory generation module 120. The dynamic parameters of the hydraulic manipulator during the soft-sensing are the dynamic parameters obtained by identifying the hydraulic manipulator based on the excitation trajectory. In some embodiments, at least one round of soft sensing performed by the test module 130 on the hydraulic manipulator may be executed under the control of the processor 110.

The display module 150 may be configured to display soft-sensing test results to a user (e.g., an operator of the hydraulic manipulator). For example, the processor 110 may send the generated soft-sensing test results to the display module 140 for display.

In some embodiments, the terminal force soft-sensing method of the hydraulic manipulator may be performed by at least one module in the soft-sensing system 100. Further descriptions regarding the terminal force soft-sensing method of the hydraulic manipulator performed by the soft-sensing system 100 may be found in other parts of the present disclosure, such as FIG. 3, etc.

In some embodiments, the soft-sensing system 100 may further include a storage module (which is not shown in the drawings). The storage module may be configured to store data, instructions, and/or any other information. For example, the storage module may store the soft-sensing test results. As another example, the storage module may store instructions for controlling the hydraulic manipulator to perform the terminal force soft-sensing method.

In some embodiments, various modules of the soft-sensing system 100 may be connected in various ways. For example, the various modules may be connected by communication, or connected by a bus servo. It should be understood that the soft-sensing system 100 and its modules are shown in FIG. 1 may be implemented in various ways. For example, in some embodiments, the processor 110, the trajectory generation module 120, the identification module 130, the test module 140, and the display module 150 may be integrated together or set separately.

It should be noted that the above description of the terminal force soft-sensing system 100 of the hydraulic manipulator and its modules is for convenience of description only, and does not limit the present disclosure to the scope of the illustrated embodiments. It should be understood that for those skilled in the art, after understanding the principles of the soft-sensing system 100, it is possible to combine various modules arbitrarily or form a sub-system to connect with other modules without departing from the principles. In some embodiments, the processor 110, the trajectory generation module 120, the identification module 130, the test module 140, and the display module 150 disclosed in FIG. 1 may be different modules in one system, or one module that may realize functions of the above two or more than two modules. For example, each module may share one storage module, or each module may have its own storage module. Such deformations are all within the protection scope of the present disclosure.

Figure 2:
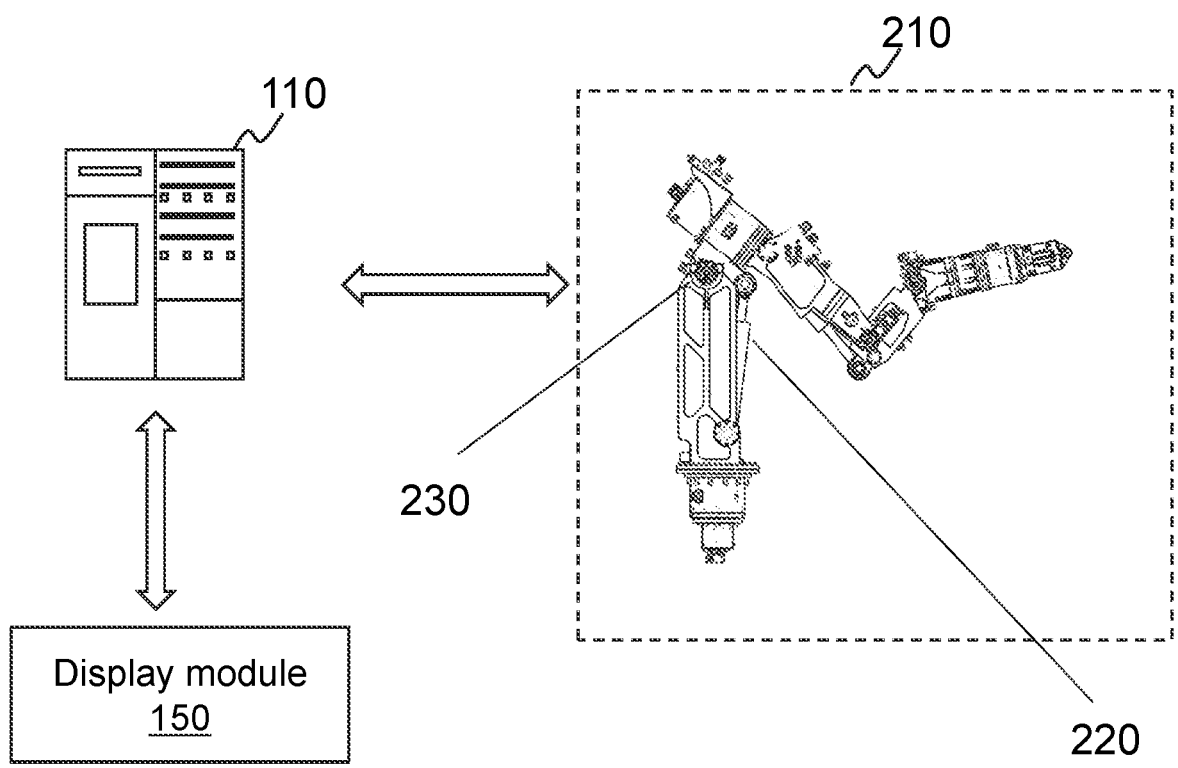
FIG. 2 is an exemplary schematic diagram illustrating a terminal force soft-sensing device of a hydraulic manipulator according to some embodiments of the present disclosure.

FIG. 2 is an exemplary schematic diagram illustrating a terminal force soft-sensing device of a hydraulic manipulator according to some embodiments of the present disclosure. As shown in FIG. 2, the terminal force soft-sensing device 200 of the hydraulic manipulator (hereinafter referred to as the soft-sensing device 200) includes a hydraulic manipulator 210, a pressure sensor 220, and an angle encoder 230.

The hydraulic manipulator 210 is a manipulator that needs terminal force soft sensing.

The pressure sensor 220 may be configured to collect pressures of two chambers of hydraulic cylinders of the hydraulic manipulator. The two chambers of hydraulic cylinders may include a rodless chamber and a rod chamber. In some embodiments, there may be at least two pressure sensors. In some embodiments, at least two pressure sensors may be respectively arranged in the two chambers of hydraulic cylinders for collecting pressures in corresponding chambers.

In some embodiments, the pressure sensor 220 may be controlled by the processor 110 to collect the pressures of the two chambers of the hydraulic cylinders of the hydraulic manipulator.

The angle encoder 230 may be configured to obtain joint angles of the hydraulic manipulator. In some embodiments, the angle encoder 230 may be deployed at a rotation joint center of the hydraulic manipulator. In some embodiments, the hydraulic manipulator may include a plurality of joints, and at least one of the plurality of joints may be provided with an angle encoder.

In some embodiments, obtaining the joint angles of the hydraulic manipulator by the angle encoder 230 may be controlled by the processor 110.

In some embodiments, the soft-sensing device 200 may further include the processor 110 and the display module 150. Further descriptions regarding the processor 110 and the display module 150 may be found in FIG. 1.

In some embodiments, the processor 110 may be connected communicatively to the pressure sensor 220 and the angle encoder 230 for obtaining sensing data collected by the pressure sensor and the angle encoder during the soft sensing, and determining soft-sensing test results based on the sensing data, and sending the soft-sensing test results to the display module 140. Further related descriptions may be found in other parts of the present disclosure, such as FIG. 3, etc. In some embodiments, various components of the device 200 may also be connected in other ways, for example, through a bus servo connection, etc.

Figure 3:
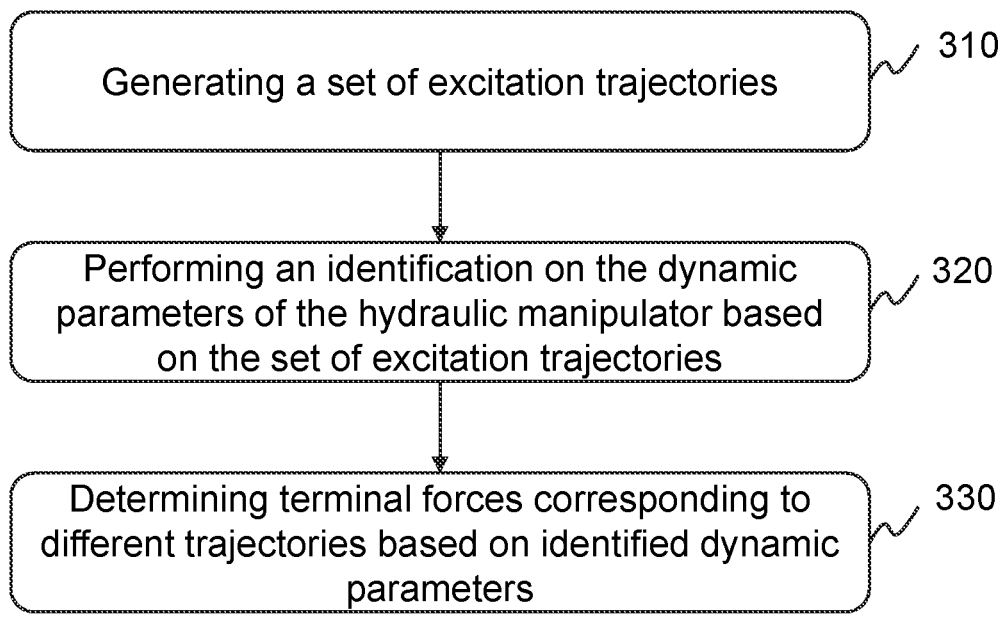
FIG. 3 is an exemplary flowchart of a terminal force soft-sensing method of a hydraulic manipulator according to some embodiments of the present disclosure.

FIG. 3 is an exemplary flowchart of a terminal force soft-sensing method of a hydraulic manipulator according to some embodiments of the present disclosure. In some embodiments, the process 300 may be executed by at least one module in the soft-sensing system 100. As shown in FIG. 3, the process 300 includes the following steps.

Step 310, generating a set of excitation trajectories.

In some embodiments, the processor 110 may control the trajectory generation module 120 to generate the set of excitation trajectories.

The excitation trajectory is an optimal trajectory of the hydraulic manipulator generated by the processor to identify the dynamic parameters of the manipulator. In some embodiments, after the processor obtains the dynamic parameters of the hydraulic manipulator based on the identification of the excitation trajectory, it may control the trajectory generation module 120 to generate a plurality of different trajectories (such as straight trajectories, triangle trajectories, ellipse trajectories, etc.); and based on the dynamic parameters obtained by the identification, the hydraulic manipulator is controlled to move according to the plurality of different trajectories, and the terminal force soft-sensing method of the hydraulic manipulator is completed.

In some embodiments, the excitation trajectory refers to an operating trajectory of the hydraulic manipulator under no load.

In some embodiments, the processor 110 may generate a set of excitation trajectories based on the following S1 (which is also referred to as step 1) and S2 (which is also referred to as step 2).

S1, establishing a dynamic model of the hydraulic manipulator, performing linearization processing on the dynamic model, and establishing a linear model of a minimum inertial parameter set of the hydraulic manipulator and a regression matrix corresponding to the minimum inertial parameter set. In some embodiments, S1 may be executed by the processor 110.

In some embodiments, the dynamic model of the hydraulic manipulator is as shown in formula (1):

$$\tau = M(q)\ddot{q} + C(\dot{q},q)\dot{q} + G(q) + f(\dot{q},q), \qquad (1)$$

wherein q denotes the joint angle of the hydraulic manipulator, $q \in R^{n \times 1}$, $\dot{q}$ denotes a joint angular velocity, $\dot{q} \in R^{n \times 1}$, $\ddot{q}$ denotes a joint angular acceleration, n denotes a count of degrees of freedom of the hydraulic manipulator, $\tau$ denotes the hydraulic driving torque, M(q) denotes an inertia torque of the hydraulic manipulator, $C(\dot{q}, q)$ denotes a Coriolis centripetal torque of the hydraulic manipulator, G(q) denotes a gravity torque of the hydraulic manipulator, and $f(\dot{q}, q)$ denotes a friction torque.

In some embodiments, the joint angle of the hydraulic manipulator may be obtained by the angle encoder 230, and the joint angular velocity and the joint angular acceleration corresponding to the joint of the hydraulic manipulator may be obtained by the joint angle processed through primary and secondary differentials. In some embodiments, the white noise of data obtained after the differentials is relatively high, and the processor 110 may perform filter processing on the data obtained after the differentials based on an offline Infinite Impulse Response (IIR) digital filter to obtain the joint angular velocity and the joint angular acceleration.

In some embodiments, the filter processing also includes phase compensation on the offline IIR digital filter. In some embodiments, the processor 110 may perform the phase compensation through various algorithms. For example, the processor 110 may use a digital all-pass filter to perform the phase compensation on the offline IIR digital filter. As another example, the processor 110 may use a bidirectional filtering algorithm to perform the phase compensation on the offline IIR digital filter.

In one or more embodiments of the present disclosure, the phase compensation performed by the processor on the offline IIR digital filter may eliminate the influence of phase cancellation on a filter result of the offline IIR digital filter, which obtains a better filter effect. For example, the phase compensation may make the joint angular velocity and the joint angular acceleration of the joint of the hydraulic manipulator obtained by the processor more in line with actual values when performing tasks such as stacking, welding, and handling.

In some embodiments, the processor 110 may also determine the joint angular velocity and the joint angular acceleration based on a candidate joint angular velocity and candidate joint angular acceleration, including: determining a first candidate joint angular velocity and a first candidate joint angular acceleration based on results of performing the primary and secondary offline differentials on the joint angle through the filter processing; determining a second candidate joint angular velocity and a second candidate joint angular acceleration through an angular parameter determination model based on the joint angle; determining the joint angular velocity based on the first candidate joint angular velocity and the second candidate joint angular velocity, and determining the joint angular acceleration based on the first candidate joint angular acceleration and the second candidate joint angular acceleration. The angular parameter determination model is a machine learning model. Further descriptions regarding determining the second candidate joint angular velocity and the second candidate joint angular acceleration based on the angular parameter determination model may be found in FIG. 4.

In some embodiments, the processor 110 may determine the joint angular velocity based on the first candidate joint angular velocity and the second candidate joint angular velocity, including: calculating a difference between the first candidate angular velocity and the second candidate angular velocity, when an absolute value of the difference exceeds a preset threshold, the data is considered abnormal, and the processor 110 may regenerate new first and second candidate angular velocities; when the absolute value of the difference does not exceed the preceding threshold, the processor 110 may take the average of the first candidate angular velocity and the second candidate angular velocity as the angular velocity.

In some embodiments, the processor 110 may also use a manner similar to determining the angular velocity to determine the angular acceleration based on the first candidate angular acceleration and the second candidate angular acceleration, which may be referred to in related descriptions of determining the angular velocity hereinabove.

In one or more embodiments of the present disclosure, the angular velocity and angular acceleration determined based on the candidate angular velocity and the candidate angular acceleration may more accurately reflect a real angular velocity and real angular acceleration of the hydraulic manipulator when performing tasks such as stacking, welding, and handling, reducing the influence of the error in determining the angular velocity and angular acceleration based on the differentials, and correspondingly improving the terminal force soft-sensing effect of the hydraulic manipulator.

In some embodiments, the processor 110 may also perform linearization processing on the dynamic model shown in formula (1), and establish a linear model of the minimum inertial parameter set of the hydraulic manipulator and its corresponding regression matrix.

In some embodiments, the linear model of the minimum inertial parameter set and its corresponding regression matrix may be determined based on formula (2):

$$\tau = Y(q, \dot{q}, \ddot{q}) * L \qquad (2)$$

wherein $Y(q, \dot{q}, \ddot{q}) \in R^{n \times p}$ denotes the regression matrix, $L \in R^{p \times 1}$ denotes the minimum inertial parameter set, p denotes a count of elements in the minimum parameter set, and $\tau$ denotes a hydraulic driving torque when the hydraulic manipulator operates according to the excitation trajectory.

In some embodiments, the linear model of the minimum inertial parameter set may be obtained by performing the linearization processing on the dynamic model of the hydraulic manipulator shown in formula (1) and then merging and reorganizing each linearly related item. Taking n as 3, i.e., taking a three-degree-of-freedom hydraulic manipulator as an example, the linear model of the minimum inertia parameter set is as follows:

$$\begin{bmatrix} \tau_1 \\ \tau_2 \\ \tau_3 \end{bmatrix} = \begin{bmatrix} g\cos(q_1) & 0 & 0 \\ -g\sin(q_1) & 0 & 0 \\ \ddot{q}_1 & 0 & 0 \\ \dot{q}_1 r_1^2 & 0 & 0 \\ \text{sgn}(\dot{q}_1)r_1 & 0 & 0 \\ Y(1,6) & Y(2,6) & 0 \\ Y(1,7) & Y(2,7) & 0 \\ \ddot{q}_1 - \ddot{q}_2 & \ddot{q}_1 + \ddot{q}_2 & 0 \\ 0 & \dot{q}_2 r_2^2 & 0 \\ 0 & \text{sgn}(\dot{q}_2)r_2 & 0 \\ Y(1,11) & Y(2,11) & Y(2,11) \\ Y(1,12) & Y(2,12) & Y(2,12) \\ \ddot{q}_1 + \ddot{q}_2 + \ddot{q}_3 & \ddot{q}_1 + \ddot{q}_2 + \ddot{q}_3 & \ddot{q}_1 + \ddot{q}_2 + \ddot{q}_3 \\ 0 & 0 & \dot{q}_3 r_3^2 \\ 0 & 0 & \text{sgn}(\dot{q}_2)r_2 \end{bmatrix}^T \begin{bmatrix} L(1) \\ m_1 c_{y1} \\ L(3) \\ f_{v1} \\ f_{c1} \\ m_2 c_{x2} + m_3 a_2 \\ m_2 c_{y2} \\ L(7) \\ f_{v2} \\ f_{c2} \\ m_3 c_{x3} \\ m_3 c_{y3} \\ m_3 l_3^2 + I_{zz3} \\ f_{v3} \\ f_{c3} \end{bmatrix}$$

wherein, $L(1) = m_1 c_{x1} + m_2 a_1 + m_3 a_1$, $L(3) = m_1 l_1^2 + I_{zz1} + m_2 a_1^2 + m_3 a_1^2$, $L(7) = I_{zz2} + m_3 a_2^2 + m_2 l_2^2$.

$Y(2,6) = a_1 \ddot{q}_1 \cos(q_2) + a_1 \dot{q}_1^2 \sin(q_2) + g \cos(q_1 + q_2)$.

$Y(2,7) = -a_1 \ddot{q}_1 \sin(q_2) + a_1 \dot{q}_1^2 \cos(q_2) - g \sin(q_1 + q_2)$.

$Y(1,6) = Y(2,6) + a_1 (\ddot{q}_1 + \ddot{q}_2)\cos(q_2) - a_1 (\dot{q}_1 + \dot{q}_2)^2 \sin(q_2)$.

$Y(1,7) = Y(2,7) - a_1 (\ddot{q}_1 + \ddot{q}_2)\sin(q_2) - a_1 (\dot{q}_1 + \dot{q}_2)^2 \cos(q_2)$.

$Y(3,11) = a_1 \ddot{q}_1 \cos(q_2 + q_3) + a_1 \dot{q}_1^2 \sin(q_2 + q_3) + a_2 (\ddot{q}_1 + \ddot{q}_2)\cos(q_3) + a_2 (\dot{q}_1 + \dot{q}_2)^2 \sin(q_3) + g \cos(q_1 + q_2 + q_3)$.

$Y(3,12) = -a_1 \ddot{q}_1 \sin(q_2 + q_3) + a_1 \dot{q}_1^2 \cos(q_2 + q_3) - a_2 (\ddot{q}_1 + \ddot{q}_2)\sin(q_3) + a_2 (\dot{q}_1 + \dot{q}_2)^2 \cos(q_3) - g \sin(q_1 + q_2 + q_3)$.

$Y(2,11) = Y(3,11) + a_2 (\ddot{q}_1 + \ddot{q}_2 + \ddot{q}_3)\cos(q_3) - a_2 \dot{q}_3 (\dot{q}_1^2 + \dot{q}_2^2 + 2\dot{q}_1 \dot{q}_2 + 2\dot{q}_1 + 2\dot{q}_2 + \dot{q}_3)\sin(q_3)$.

$Y(2,12) = Y(3,12) - a_2 (\ddot{q}_1 + \ddot{q}_2 + \ddot{q}_3)\sin(q_3) - a_2 \dot{q}_3 (\dot{q}_1^2 + \dot{q}_2^2 + 2\dot{q}_1 \dot{q}_2 + 2\dot{q}_1 + 2\dot{q}_2 + \dot{q}_3)\cos(q_3)$.

$Y(1,11) = Y(2,11) + a_1 (\ddot{q}_1 + \ddot{q}_2 + \ddot{q}_3)\cos(q_2 + q_3) - a_1 (2\dot{q}_1 \dot{q}_2 + 2\dot{q}_1 \dot{q}_3 + 2\dot{q}_2 \dot{q}_3 + \dot{q}_1^2 + \dot{q}_2^2 + \dot{q}_3^2)\sin(q_2 + q_3)$.

$Y(1,12) = Y(2,12) - a_1 (\ddot{q}_1 + \ddot{q}_2 + \ddot{q}_3)\sin(q_2 + q_3) - a_1 (2\dot{q}_1 \dot{q}_2 + 2\dot{q}_1 \dot{q}_3 + 2\dot{q}_2 \dot{q}_3 + \dot{q}_1^2 + \dot{q}_2^2 + \dot{q}_3^2)\cos(q_2 + q_3)$.

For a three-degree-of-freedom hydraulic manipulator, 1 includes 1, 2, and 3, $m_i$ denotes the mass of each link of the hydraulic manipulator, $l_i$ denotes a distance from each joint node to the center of mass of each link, $c_x$ and $c_y$ denotes locations of link centers of masses along with link coordinates, $I_{zz}$ denotes a moment of inertia about the Z-axis, and $Y(2,6)$ is used as an example to represent elements of the regression matrix Y in the second row and sixth column. g denotes a constant gravitational acceleration, $a_1$ and $a_2$ respectively denote a length of a link between two joints, $f_c$ denotes a Coulomb friction coefficient, $f_v$ denotes a viscous friction coefficient, and $r_i$ denotes an effective power arm of the hydraulic cylinders. The meanings of other letters are the same as those in formula (1).

The above description of the dynamic model of the hydraulic manipulator is only an example and does not constitute a limitation thereto. For those skilled in the art, without further creative efforts, may contract other forms of dynamic models of hydraulic manipulators, e.g., a dynamic model of a seven-degree-of-freedom hydraulic manipulator, etc.

S2, generating an excitation trajectory, wherein the excitation trajectory is obtained by solving a finite Fourier series coefficient by taking a condition count of the regression matrix of S1 minimal as a goal.

In some embodiments, the finite Fourier series may be expressed by formula (3):

$$q_i(t) = \sum_{l=1}^{N} \left( \left( \frac{a_{l,i}}{\omega_f l} \sin(\omega_f l t) - \frac{b_{l,i}}{\omega_f l} \cos(\omega_f l t) \right) \right) + q_{i0} \quad (3)$$

For an i-th joint, a count of sine and cosine terms are both N (hereinafter also referred to as a count of sine and cosine terms are value N), l denotes a coefficient, t denotes an operating time of the excitation trajectory, and $\omega_f$ denotes a baseband and is specified as $2\pi f_f$. In some embodiments of the present disclosure, when i is specified as 3 and N is specified as 5, the excitation time lasts for 20 s, $f_f$ is specified as 0.05HZ, and $\omega_f$ is specified as $0.1\pi$. $a_{l,i}$, $b_{l,i}$, and $q_{i0}$ denote Fourier coefficients to be solved, which are solved based on a manner for finding out an optimal solution of a multivariate function with constraints.

In some embodiments, to ensure that the hydraulic manipulator operates stably within a reachable safety range, constraints may be set. Exemplary constraints are shown in formula (4):

$$\begin{cases} \text{cond}_{min}(Y) \\ q(0) = q_0, q(t_f) = q_0 \\ \dot{q}(0) = 0, \dot{q}(t_f) = 0 \\ \ddot{q}(0) = 0, \ddot{q}(t_f) = 0 \\ q_{min} \le q(t) \le q_{max} \\ \dot{q}_{min} \le \dot{q}(t) \le \dot{q}_{max} \\ \ddot{q}_{min} \le \ddot{q}(t) \le \ddot{q}_{max} \end{cases} \quad (4)$$

wherein $\text{cond}_{min}(Y)$ denotes taking the condition count of the regression matrix minimal as an optimization goal, and q(t) denotes a joint angle of the hydraulic manipulator at time t; $q_0$ denotes an initial joint angle of the hydraulic manipulator, when a cycle ends, t is specified as $t_f$, $t_f$ denotes an end moment, the hydraulic manipulator returns to the initial joint angle $q_0$ of the hydraulic manipulator to execute the next cycle continuously, and velocities and accelerations at an initial moment t (wherein t=0) and the end moment $t_f$ are set to 0 to effectively avoid an impact; $q_{min}$, $\dot{q}_{min}$, $\ddot{q}_{min}$, $q_{max}$, $\dot{q}_{max}$, and $\ddot{q}_{max}$ are respectively minimum and maximum values of an angle, an angular velocity, and angular acceleration when the hydraulic manipulator moves; and the hydraulic manipulator is ensured to move within a safe range by setting an upper limit and a lower limit of the angle, the angular velocity, and the angular acceleration.

In some embodiments, the processor 110 may determine the excitation trajectory after solving the finite Fourier series coefficient based on the constraints. For example, the processor may calculate the excitation trajectory based on solving the finite Fourier series.

Step 320, performing the identification on the dynamic parameters of the hydraulic manipulator based on the set of excitation trajectories.

In some embodiments, the processor 110 may control the identification module 130 to perform the identification of the dynamic parameters of the hydraulic manipulator based on the excitation trajectory. For example, the processor may control the hydraulic manipulator to operate at least once based on the excitation trajectory and control the identification module 130 to perform the identification of dynamic parameters of the hydraulic manipulator. The identification of dynamic parameters may include collecting the pressures of the two chambers of the hydraulic cylinders of the hydraulic manipulator based on the pressure sensor 220, obtaining the joint angle of the hydraulic manipulator based on the angle encoder 230, etc.

In some embodiments, the processor 110 may perform the identification of the dynamic parameters of the hydraulic manipulator based on the following S3 (which is also referred to as step 3) and S4 (which is also referred to as step 4).

S3, determining the hydraulic driving torque and a total regression matrix.

In some embodiments, the hydraulic driving torque may be determined by collected values of pressure sensors of two chambers of hydraulic cylinders when controlling the hydraulic manipulator to operate the excitation trajectory under a no-load condition. For example, the processor 110 may control the hydraulic manipulator to operate based on at least one excitation trajectory generated in step 310 under the no-load condition, and control the pressure sensor 220 to collect pressure values of the two chambers of the hydraulic cylinders when the hydraulic manipulator is operating; and determine the hydraulic driving torque based on the pressure values.

In some embodiments, the hydraulic driving torque may be obtained based on a sensor (such as a torque sensor).

In some embodiments, the hydraulic driving torque may also be determined based on a pressure of a rodless chamber and a rod chamber of the hydraulic cylinders and their corresponding areas. Exemplarily, the processor may determine the hydraulic driving torque based on formula (5):

$$\tau_i = (P_{ai} A_{ai} - P_{bi} A_{bi}) * r_i \quad (5)$$

wherein i denotes a joint serial number, $\tau_i$ indicates a hydraulic driving torque corresponding to the i-th joint, $P_{ai}$ and $P_{bi}$ respectively denote the pressure of the rodless chamber and the rod chamber of the hydraulic cylinders, which are measured by the pressure sensors, $A_{ai}$ and $A_{bi}$ denote an area of the rodless chamber and an area of the rod chamber of the hydraulic cylinders, respectively, and $r_i$ is an effective power arm of the hydraulic cylinders.

In one or more embodiments of the present disclosure, the hydraulic driving torque is determined based on the pressure of the rodless chamber and the pressure of the rod chamber of the hydraulic cylinders and their corresponding areas, which may save costs without installing additional sensors.

In some embodiments, the total regression matrix may be obtained by bringing the joint angles, the joint angular velocities, and the joint angular accelerations at each moment when the hydraulic manipulator operates into the regression matrix.

In some embodiments, the total regression matrix may be determined based on the following formula (6):

$$Y=[Y_1^T\ Y_2^T\ \ldots\ Y_k^T]^T \quad (6)$$

wherein $Y_1^T$, $Y_2^T$, ..., and $Y_k^T$ respectively denote a regression matrix of the hydraulic manipulator at different operating moments, and k denotes a count of time interval points. Further descriptions regarding the regression matrix may be found in the related part of step 310.

S4, determining the dynamic parameters of the hydraulic manipulator.

In some embodiments, the processor 110 may determine the dynamic parameters of the hydraulic manipulator based on the hydraulic driving torque and the total regression matrix determined in S3. In some embodiments, the dynamic parameters of the hydraulic manipulator may be represented by a minimum inertial parameter set L.

In some embodiments, the minimum inertial parameter set L may be determined based on the following formula (7):

$$L=(Y^T Y)^{-1} Y^T \tau \quad (7)$$

In some embodiments, the dynamic parameters of the hydraulic manipulator identified based on the excitation trajectory are dynamic parameters of the hydraulic manipulator under the no-load condition. In some embodiments, the dynamic parameters are universal, and based on the parameters, the processor may determine the terminal force of the hydraulic manipulator when it operates under load based on a plurality of other trajectories.

Step 330, determining terminal forces corresponding to different trajectories based on identified dynamic parameters.

In some embodiments, the processor 110 may control the test module 140 to calculate the terminal forces corresponding to different trajectories based on the identified dynamic parameters. The different trajectories may be generated in large quantities by the trajectory generation module 120. In some embodiments, the processor 110 may calculate the terminal forces corresponding to different trajectories based on the following S5 (which is also referred to as step 5).

S5, determining the terminal force of the hydraulic manipulator.

In some embodiments, the processor may determine the terminal force of the hydraulic manipulator based on the dynamic parameters of the hydraulic manipulator determined in S4 and the linear model described in 51.

In some embodiments, the terminal force of the hydraulic manipulator may be determined based on formula (8):

$$F=(J_{qt}^T)^{-1}*(\tau_i - Y(q,\dot{q},\ddot{q})L) \quad (8)$$

wherein F denotes the terminal force of the hydraulic manipulator; $J_{qt}^T$ denotes a transposition of a Jacobian matrix of the hydraulic manipulator; $Y(q, \dot{q}, \ddot{q}) \in R^{n \times p}$ denotes the regression matrix, $L \in R^{p \times 1}$ denotes the minimum inertial parameter set, p denotes the count of elements in the minimum inertial parameter set, and n denotes the degree of freedom of the hydraulic manipulator.

In some embodiments, to obtain a large amount of terminal force data of the hydraulic manipulator, and ensure the service life of the hydraulic manipulator while improving the accuracy of the test results, the processor may also measure the terminal force of the hydraulic manipulator based on a simulation manner.

In some embodiments, the processor may generate a large amount (such as more than 100,000) of operating trajectories based on the simulation manner in a single run, and perform the terminal force soft sensing based on dynamic parameters of the hydraulic manipulator obtained after identifying the dynamic parameters of the hydraulic manipulator for the excitation trajectories. For example, the processor may simulate a large amount of possible operating trajectories of the hydraulic manipulator when performing tasks such as stacking, welding, and handling, and calculate the terminal force of the hydraulic manipulator corresponding to each trajectory.

In some embodiments, the processor may determine whether the terminal force of the hydraulic manipulator is abnormal based on the terminal force of the hydraulic manipulator determined by the soft sensing and a standard terminal force of the hydraulic manipulator. For example, the processor may compare the terminal force of the hydraulic manipulator determined by the soft sensing with the standard terminal force of the hydraulic manipulator, when the absolute value of the difference between the terminal force and the standard terminal force is greater than the preset threshold, the processor may determine the terminal force of the hydraulic manipulator being abnormal. The processor may determine the standard terminal force of the hydraulic manipulator based on historical data on the hydraulic manipulator. In some embodiments, the terminal force soft-sensing method of the hydraulic manipulator further includes: in response to the terminal force of the hydraulic manipulator determined by the soft sensing being abnormal, the processor issuing a pre-warning to users through a display module, etc.

In one or more embodiments of the present disclosure, determining whether the terminal force of the hydraulic manipulator is abnormal based on the measured terminal force of the hydraulic manipulator and the standard terminal force may remind the users to repair and maintain the hydraulic manipulator in time.

In some embodiments, the processor may also determine a maintenance strategy for the hydraulic manipulator in response to the terminal force of the hydraulic manipulator being abnormal.

The maintenance strategy may include whether repair is required, whether maintenance is required (such as adding lubricating oil, etc.), and specific parts (such as a certain joint) that need repair and maintenance, etc.

In some embodiments, the processor may determine the maintenance strategy based on historical data. For example, the processor may determine the historical maintenance strategies of the hydraulic manipulator as a current maintenance strategy, etc.

In some embodiments, the processor may determine the maintenance strategy for the hydraulic manipulator based on a vector database.

The vector database refers to a database used to store, index, and query vectors, through which similarity queries and other vector management may be quickly performed on a large number of vectors. In some embodiments, the vector database may include reference vectors constructed from a large amount (e.g., more than 100,000) of historical joint angles, historical joint angular velocities, historical joint angular accelerations, and historical terminal forces of the hydraulic manipulator and recommended maintenance strategies corresponding to the reference vectors. The recommended maintenance strategy may be a strategy for maintaining the hydraulic manipulator during a historical production process.

In some embodiments, the processor may construct a matching vector based on the joint angles, joint angular velocities, joint angular accelerations, and terminal force when performing the terminal force soft-sensing of the hydraulic manipulator in a no-load status. The processor may match a reference vector meeting a preset condition from the vector database based on the matching vector, and determine a recommended maintenance strategy corresponding to the reference vector as a current maintenance strategy of the hydraulic manipulator. The preset condition may include a distance (e.g., a cosine distance, a Euclidean distance, a Manhattan distance, a Chebyshev distance, etc.) between the matching vector and the reference vector being the smallest or meeting a threshold, etc.

In one or more embodiments of the present disclosure, the maintenance strategy of the hydraulic manipulator may be determined through vector database matching, which may better repair and maintain the hydraulic manipulator and prolong its service life.

The terminal force soft-sensing method of the hydraulic manipulator described in some embodiments of the present disclosure may at least have the following effects: (1) compared with the method for measuring the terminal force by a sensor, the terminal force soft-sensing method of the hydraulic manipulator described in some embodiments of the present disclosure solves a problem of a force sensor being prone to damage under complex working conditions, resulting in the inability to accurately perceive the terminal force; (2) compared with existing sensor less-based interaction force estimation methods (such as direct estimation based on an inverse dynamics model and an ESO-based external force estimation method), the terminal force soft-sensing method of the hydraulic manipulator described in some embodiments of the present disclosure may improve accuracy of soft sensing of the external force; and (3) some embodiments of the present disclosure propose a general terminal force soft-sensing method of the hydraulic manipulator, and the dynamic parameters obtained through the excitation trajectory may meet the requirements in different application scenarios.

Figure 4:
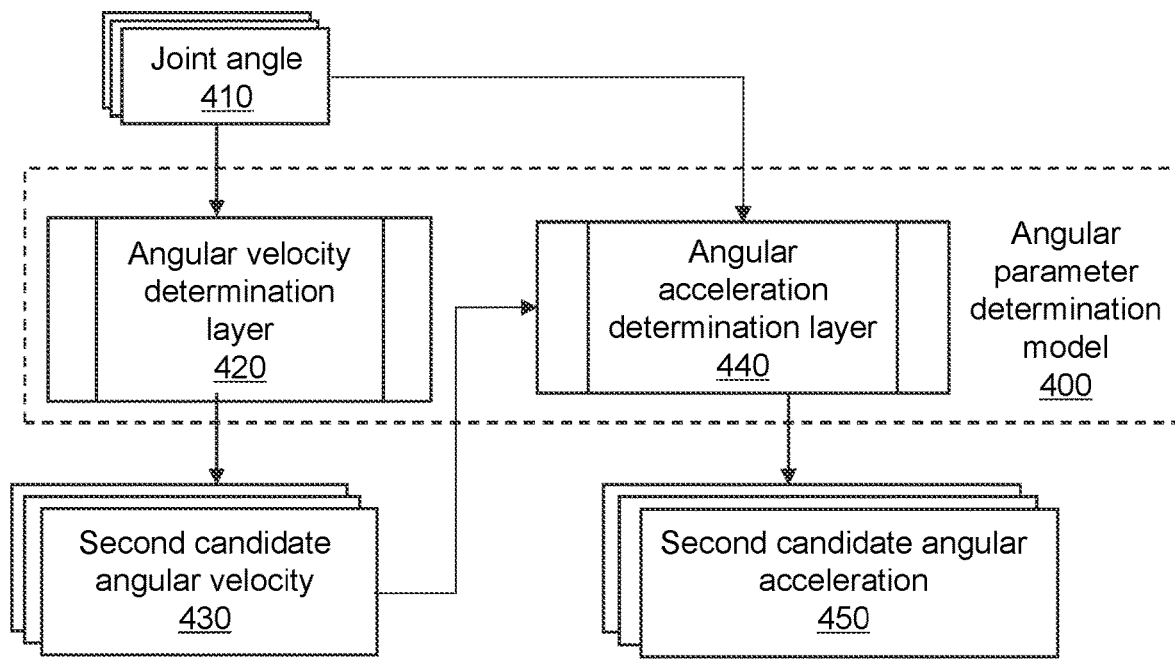
FIG. 4 is an exemplary schematic diagram illustrating an angular parameter determination model according to some embodiments of the present disclosure.

FIG. 4 is an exemplary schematic diagram illustrating an angular parameter determination model according to some embodiments of the present disclosure. In some embodiments, the angular parameter determination model is a machine learning model, such as a deep neural network (DNN) model, a recurrent neural network (RNN) model, etc., or any combination thereof.

In some embodiments, as shown in FIG. 4, the angular parameter determination model 400 may include an angular velocity determination layer 420 and an angular acceleration determination layer 440.

The angular velocity determination layer 420 may be configured to determine a second candidate angular velocity 430. In some embodiments, an input of the angular velocity determination layer 420 may include a joint angle 410, and an output of the angular velocity determination layer 420 may include the second candidate angular velocity 430. The input joint angle 410 may be a sequence composed of joint angle data at a plurality of moments when the hydraulic manipulator is operating based on the excitation trajectory, and the output second candidate angular velocity may be a sequence corresponding to the sequence composed of joint angle data. Further descriptions regarding the joint angle and the second candidate angular velocity may be found in FIG. 3.

In some embodiments, the angular velocity determination layer 420 may be separately trained based on a first training sample and a first label. The first training sample may be a historical joint angle, and the first label may be a historical angular velocity corresponding to the historical joint angle. The first training sample may be obtained based on the operating data of the historical hydraulic manipulator, and the first label may be marked manually. In some embodiments, the first training sample may include a large amount (e.g., more than 100,000 pieces) of historical data, which may enable a trained model to obtain more accurate prediction effects.

The angular acceleration determination layer 440 may be configured to determine the second candidate angular acceleration 450. In some embodiments, an input of the angular acceleration determination layer 440 may include the second candidate angular velocity 430 and the joint angle 410 output by the angular velocity determination layer 420, and an output of the angular acceleration determination layer 440 may include the second candidate angular acceleration 450. The second candidate angular acceleration 450 may be a sequence corresponding to a sequence composed of the second candidate angular velocity and a sequence composed of the joint angle. Further descriptions regarding the second candidate angular acceleration may be found in FIG. 3.

In some embodiments, the angular acceleration determination layer 440 may be determined by training a second training sample and a second label alone. The second training sample may be a historical joint angle and a historical joint angular velocity, and the second label may be a historical joint angular acceleration. The second training sample may be obtained based on the operation data of the historical hydraulic manipulator, and the second label may be marked manually. In some embodiments, the second training sample may include a large amount (e.g., more than 100,000 pieces) of historical data, which may enable the trained model to obtain more accurate prediction effects.

In some embodiments, the angular velocity determination layer 420 and the angular acceleration determination layer 440 may also be determined by joint training. The exemplary joint training process includes: the processor inputs a large number of first training samples with first labels into an initial angular velocity determination layer to obtain an output second candidate angular velocity; the processor then inputs the second candidate angular velocity output by the initial angular velocity determination layer and corresponding historical joint angle data into an initial angular acceleration determination layer, and obtains second candidate angular acceleration output by the angular acceleration determination layer until the training is completed. The initial angular velocity determination layer and the initial angular acceleration determination layer after training are determined as the angular parameter determination model. Conditions for completing the training include loss function less than the threshold, convergence, or a training cycle reaching the threshold, etc. The initial angular velocity determination layer and the initial angular acceleration determination layer refer to models with no parameters set.

In one or more embodiments of the present disclosure, the angular parameter determination model determined by the joint training may better predict the second candidate angular velocity and second candidate angular acceleration, thereby improving the accuracy of measuring the terminal force of the hydraulic manipulator.

In one or more embodiments of the present disclosure, the second candidate angular velocity and the second candidate angular acceleration determined by the machine learning model may better reflect an actual operation condition of the hydraulic manipulator, reduce errors, and correspondingly improve the accuracy of the terminal force soft sensing of the hydraulic manipulator.

Figure 5:
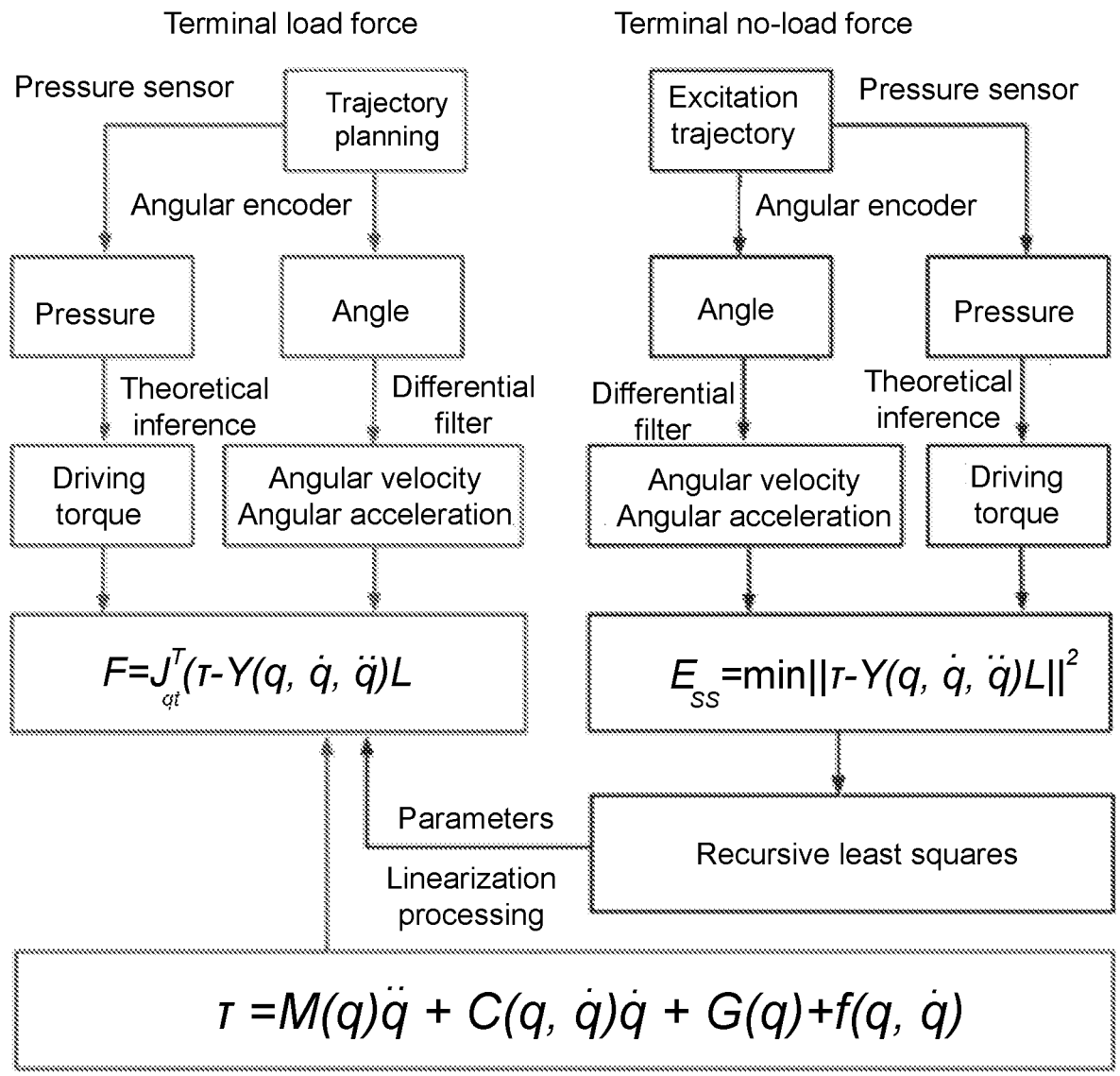
FIG. 5 is a block diagram illustrating a terminal force soft-sensing method of a seven-degree-of-freedom hydraulic manipulator.
Figure 6:
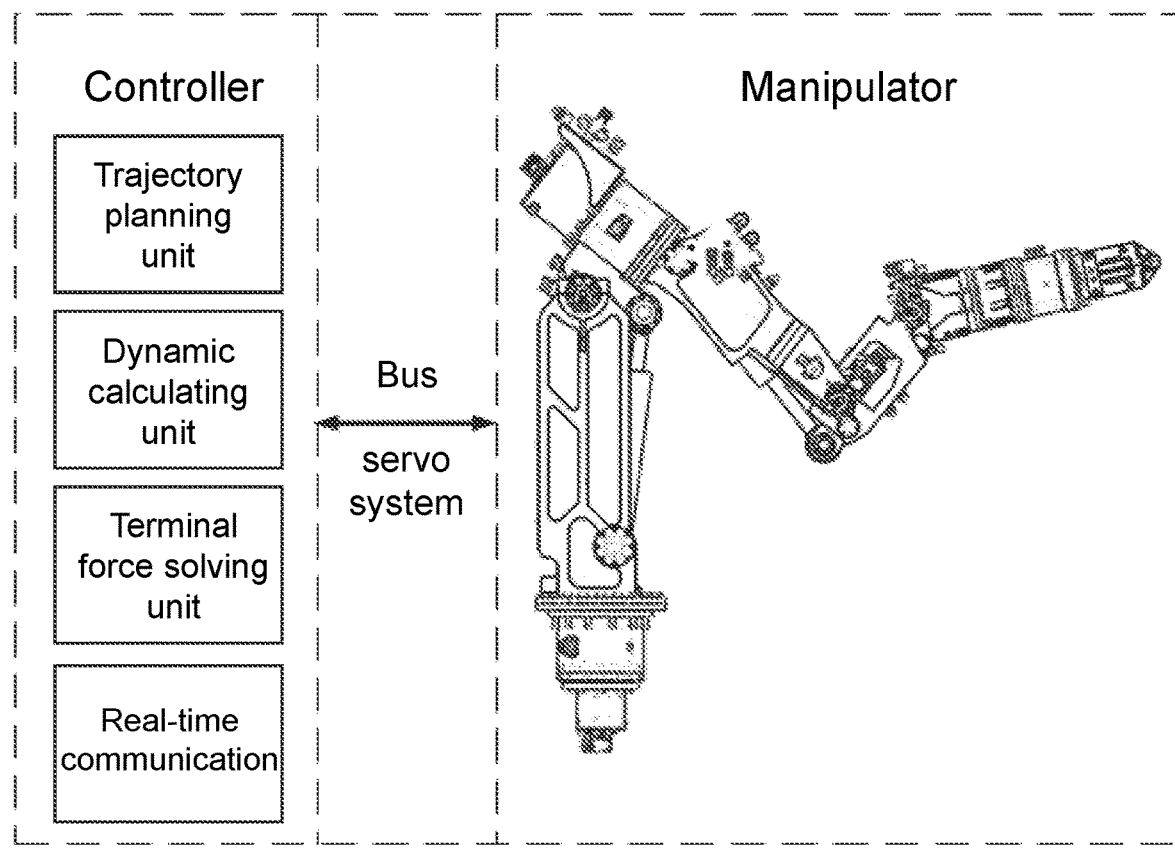
FIG. 6 is a system block diagram illustrating the seven-degree-of-freedom hydraulic manipulator.

FIG. 5 is a schematic diagram illustrating a process for providing a specific implementation (which may also be referred to as embodiment 1 hereinafter) of an application system for a seven-degree-of-freedom redundant hydraulic manipulator according to the terminal force soft-sensing method of the hydraulic manipulator described in some embodiments of the present disclosure. FIG. 6 is an exemplary schematic diagram illustrating the application system for the seven-degree-of-freedom redundant hydraulic manipulator.

As shown in FIG. 5, the specific implementation includes: first, establishing a dynamic model of the hydraulic manipulator, and establishing a minimum inertial parameter set model of the manipulator according to the dynamic model; collecting pressure data of two chambers of hydraulic cylinders and joint angle data under an excitation trajectory, calculating a hydraulic driving torque, and obtaining a joint angular velocity and angular acceleration by differential processing and filter processing, thereby solving dynamic parameters of the hydraulic manipulator, and calculating an external force on a terminal of the manipulator according to the dynamic parameters.

In the present disclosure, comparative example 1 may also be used to measure the terminal force of the seven-degree-of-freedom redundant hydraulic manipulator shown in FIG. 6. The difference from embodiment 1 is that in comparative example 1, the realization of the terminal force soft sensing of the hydraulic manipulator adopted a direct estimation method using inverse dynamics proposed by a letter (Koivumki J; Mattila J. *Stability-Guaranteed Force-Sensorless Contact Force/Motion Control of Heavy-Duty Hydraulic Manipulators. IEEE Transactions on Robotics*, 2015). The direct estimation model is:

$$F=(J_{qt}^T)^{-1}(\tau-M(q)\ddot{q}-C(\dot{q},q)\dot{q}-G(q)-f(\dot{q},q))$$

wherein F denotes the terminal force; $J_{qt}^T$ denotes the transposition of a Jacobian matrix of the manipulator; $\tau$ denotes the hydraulic driving torque, M(q) denotes an inertia torque of the hydraulic manipulator, $C(\dot{q}, q)$ denotes a Coriolis centripetal torque of the hydraulic manipulator, G(q) denotes a gravity torque of the hydraulic manipulator, and $f(\dot{q}, q)$ denotes a friction torque, including Coulomb friction and viscous friction.

Figure 7:
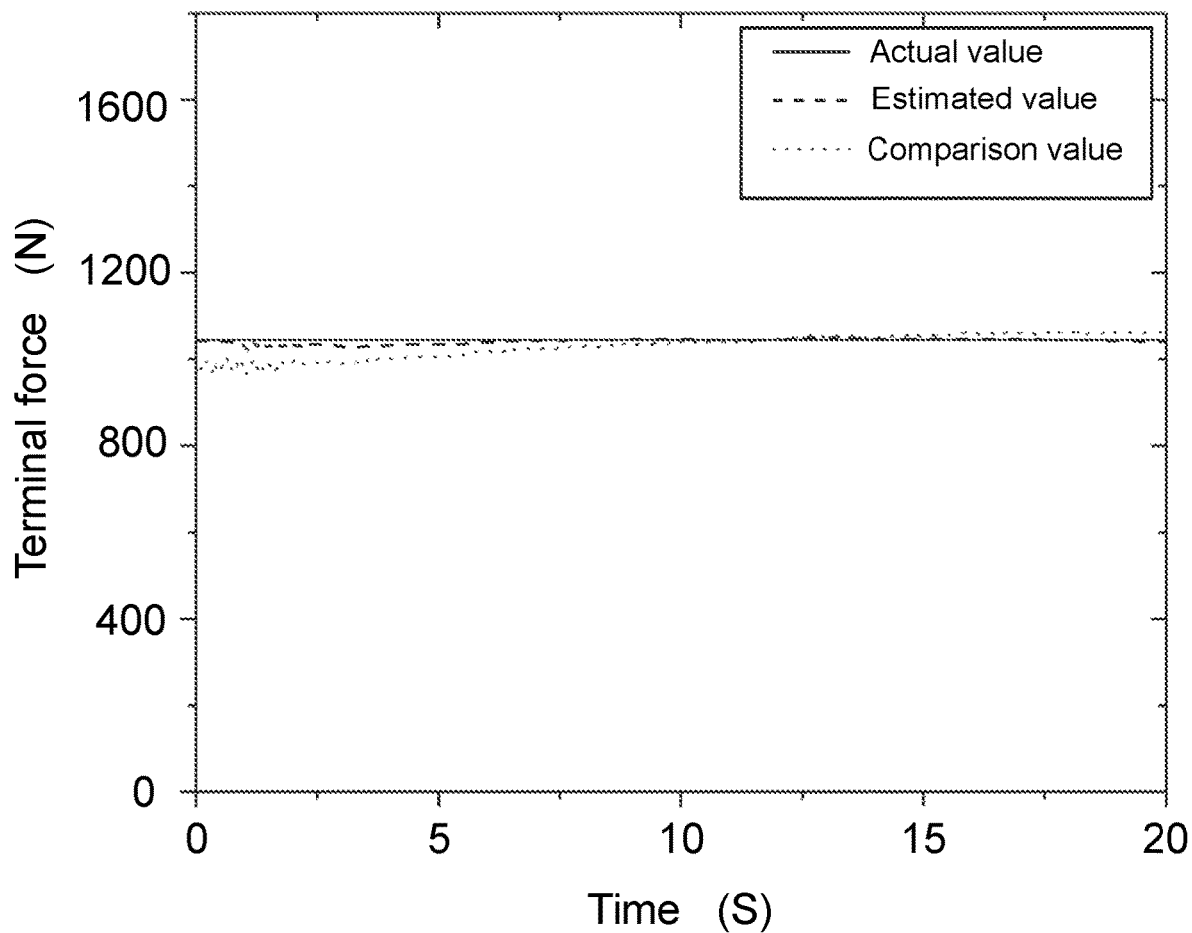
FIG. 7 is a diagram illustrating a comparison between actual values and estimated values of a terminal force of a hydraulic manipulator's straight trajectory in embodiment 1 of the present disclosure.
Figure 8:
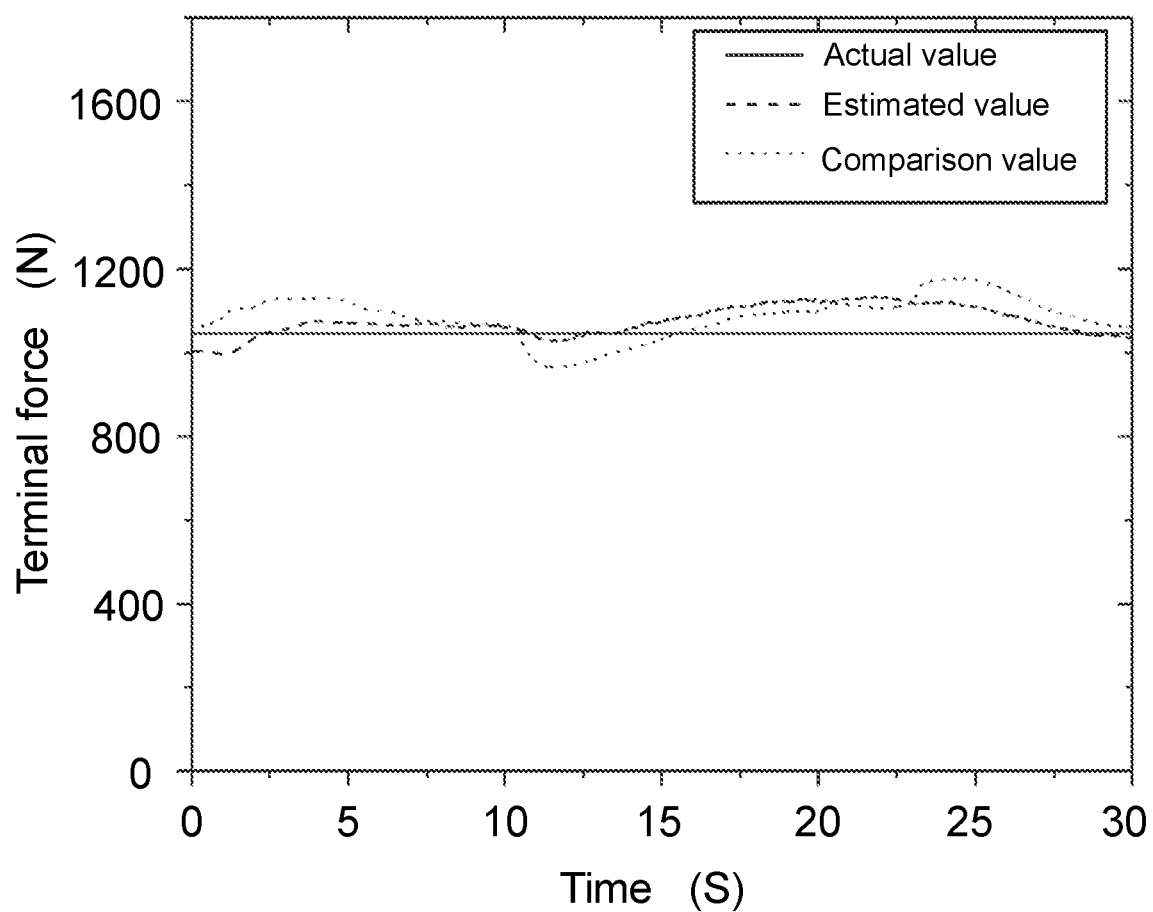
FIG. 8 is a diagram illustrating a comparison between actual values and estimated values of a terminal force of a hydraulic manipulator's triangular trajectory in embodiment 1 of the present disclosure.
Figure 9:
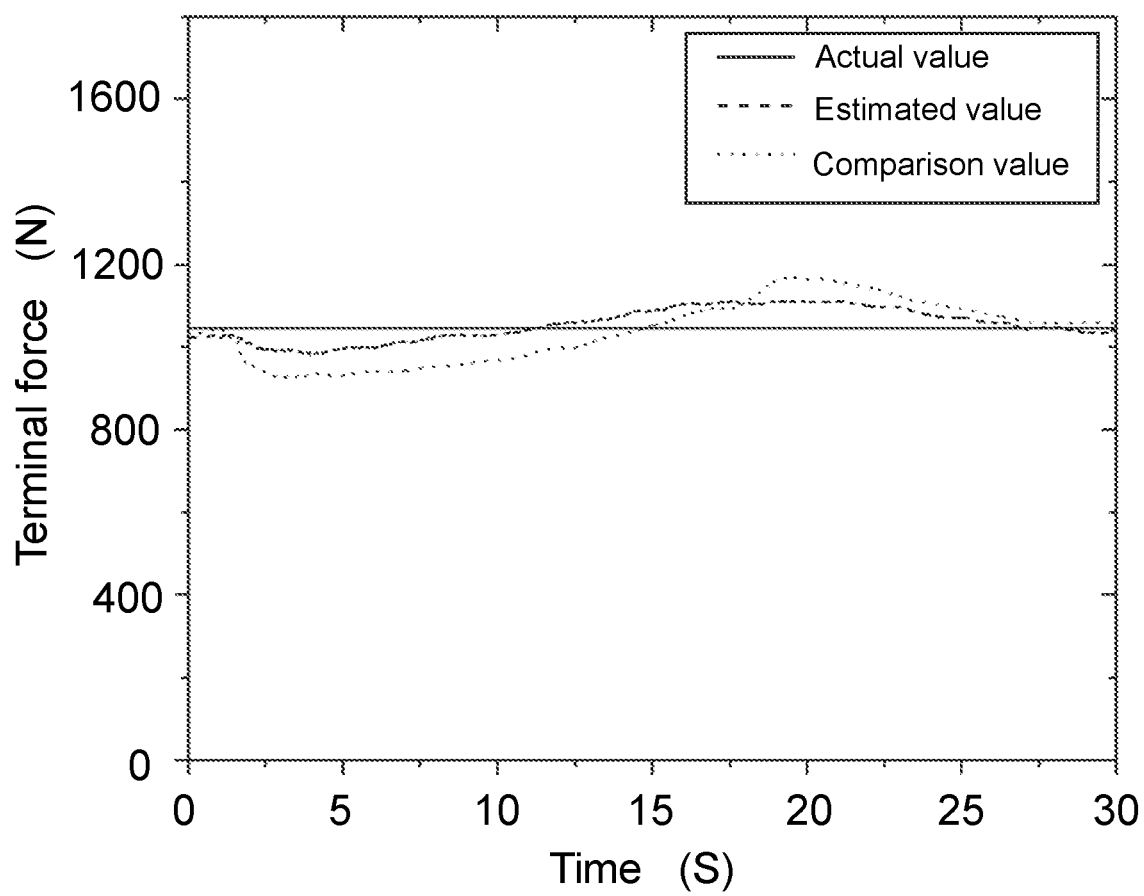
FIG. 9 is a diagram illustrating a comparison between actual values and estimated values of a terminal force of a hydraulic manipulator's elliptical trajectory in embodiment 1 of the present disclosure.
Figure 10:
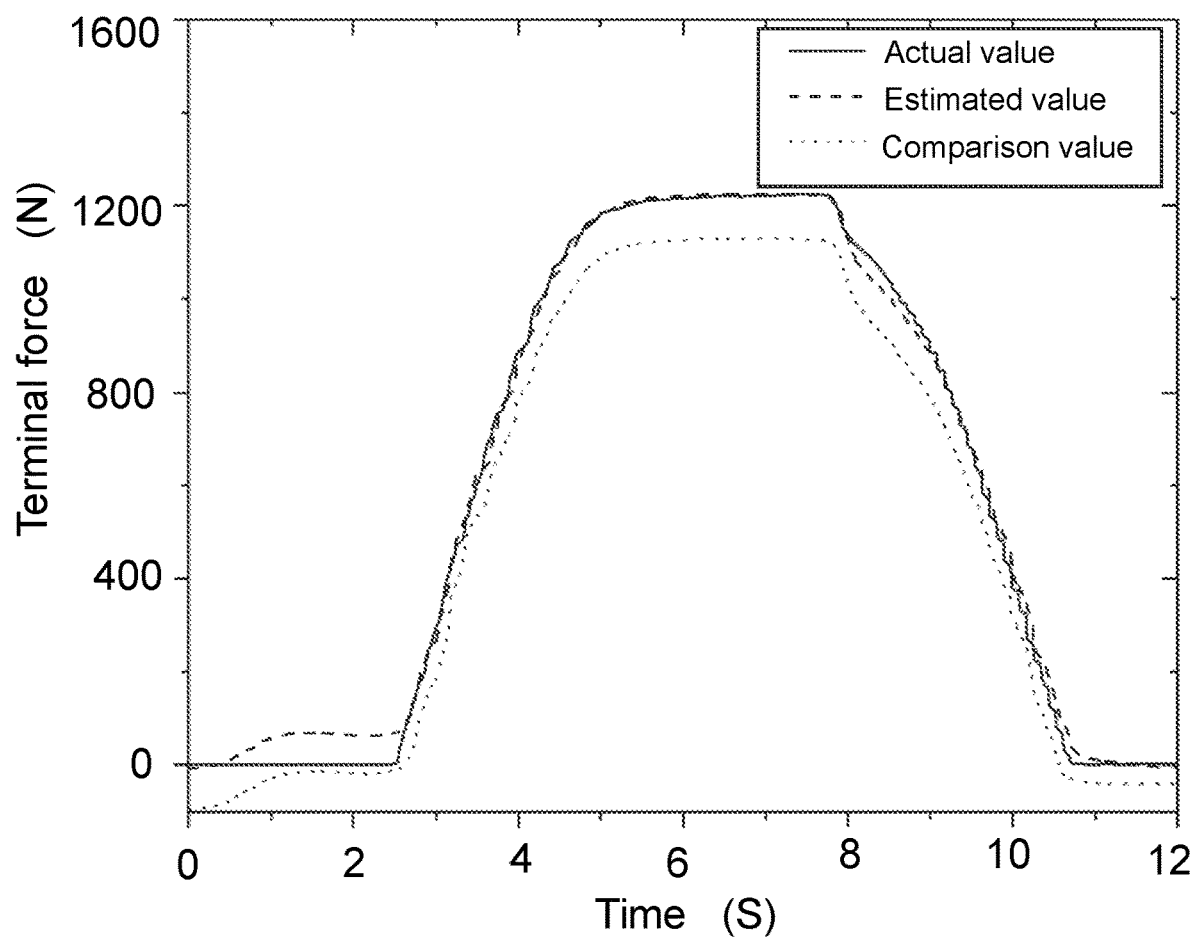
FIG. 10 is a diagram illustrating a comparison between actual values and estimated values of a terminal force of a hydraulic manipulator under a variable load force in embodiment 1 of the present disclosure.
Figure 11:
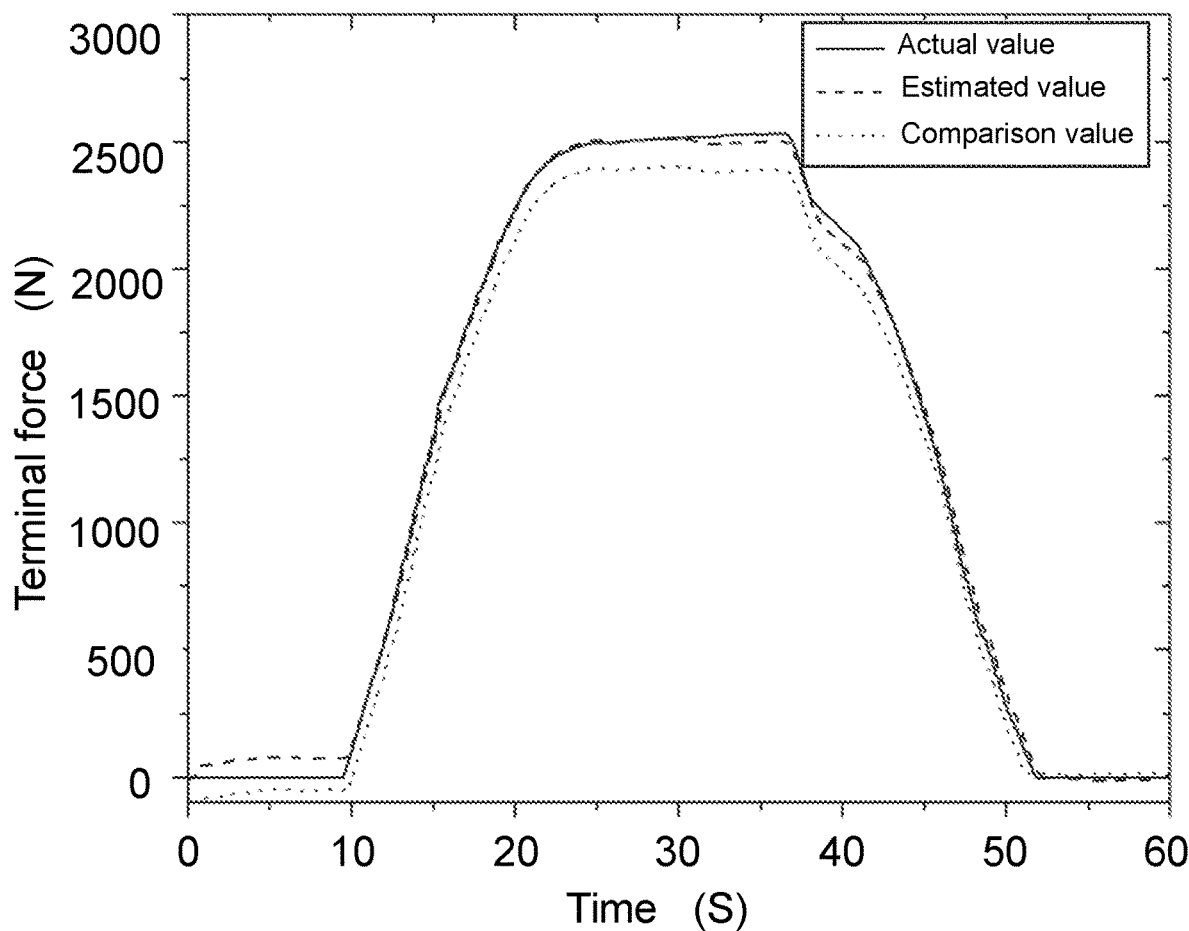
FIG. 11 is a diagram illustrating a comparison between actual values and estimated values of a terminal force of a hydraulic manipulator under a variable load force in embodiment 1 of the present disclosure.

A constant force is applied to the terminal of the seven-degree-of-freedom hydraulic manipulator in embodiment 1. The terminal of the manipulator moves in three different trajectories of a straight, an ellipse, and a triangle in Cartesian space. An estimated effect of the external force received as well as the comparison of the estimated effect in the comparative example 1 are shown in FIGS. 7-9. "Actual value" is a weight of a heavy object hanging at the terminal, that is, an actual force on the terminal. "Estimated value" is a value of the terminal force calculated according to the method in embodiment 1. "Comparison value" is a value of the terminal force calculated according to a process and a method in comparative example 1. It may be seen from FIGS. 7-9 that adopting the terminal force soft-sensing method of the hydraulic manipulator proposed in the embodiments of the present disclosure may improve the accuracy of "soft sensing" more effectively. A variable load force is applied to the terminal of the seven-degree-of-freedom hydraulic manipulator in embodiment 1, and a spring force device is designed to apply the variable load force. The estimated effect of the external force received as well as the comparison of the estimated effect of comparative example 1 are shown in FIGS. 10-11. "Actual value" is a value of the external force on the terminal of the manipulator directly measured by force sensors, and "Estimated value" is a value of the terminal force calculated according to the method in the embodiment 1, and "Comparison value" is a value of the terminal force calculated according to the process and the method in the comparative example 1. It may be seen from FIGS. 10-11 that the present disclosure exhibits a good soft-sensing effect.

Those skilled in the art may understand that the above descriptions are only preferred examples of the present disclosure and not a limitation to the present disclosure. Although the present disclosure has been described in detail with reference to the foregoing examples, those skilled in the art can still make modifications to the technical solutions recorded in the foregoing examples, or make equivalent replacements to some technical features thereof. All modifications, equivalent replacements, etc., made within the spirit and principles of the embodiments of the present disclosure shall be included in the protection scope of the present disclosure.

What is claimed is:

1. A terminal force soft-sensing method of a hydraulic manipulator, wherein the method is executed by a processor, comprising:
    step 1, establishing a dynamic model of the hydraulic manipulator, performing linearization processing on the dynamic model, and establishing a minimum inertial parameter set of the hydraulic manipulator and a linear model of a regression matrix corresponding to the minimum inertial parameter set;
    step 2, generating an excitation trajectory by solving a finite Fourier series coefficient through taking a condition count of the regression matrix in the step 1 minimal as a goal;
    step 3, determining a hydraulic driving torque $\tau$ by collected values of pressure sensors of two chambers of hydraulic cylinders when controlling the hydraulic manipulator to operate the excitation trajectory under a no-load condition; and
        determining a total regression matrix by bringing joint angles, joint angular velocities, and joint angular accelerations at each moment into the regression matrix;
    step 4, determining dynamic parameters of the hydraulic manipulator according to the hydraulic driving torque $\tau$ obtained in the step 3 and the regression matrix; and
    step 5, determining the terminal force of the hydraulic manipulator based on the dynamic parameters of the hydraulic manipulator determined in the step 4 and the linear model in the step 1.

2. The terminal force soft-sensing method of the hydraulic manipulator according to claim 1, wherein the dynamic model in the step 1 is specifically as follows:

$$\tau=M(q)\ddot{q}+C(\dot{q},q)\dot{q}+G(q)+f(\dot{q},q)$$

wherein q denotes the joint angle of the hydraulic manipulator, $q \in R^{n \times 1}$, $\dot{q}$ denotes the joint angular velocity, $\dot{q} \in R^{n \times 1}$, $\ddot{q}$ denotes the joint angular acceleration, n denotes a count of degrees of freedom of the hydraulic manipulator, $\tau$ denotes the hydraulic driving torque, M(q) denotes an inertia torque of the hydraulic manipulator, $C(\dot{q}, q)$ denotes a Coriolis centripetal torque of the hydraulic manipulator, G(q) denotes a gravity torque of the hydraulic manipulator, and $f(\dot{q}, q)$ denotes a friction torque, including coulomb friction and viscous friction; and each joint angle is obtained by angle encoders, the angular velocity and the angular acceleration are obtained by primary and secondary offline differentials of the joint angle, and an offline Infinite Impulse Response (IIR) digital filter is designed for filter processing due to high white noise of data after the differentials.

3. The terminal force soft-sensing method of the hydraulic manipulator according to claim 1, wherein the linear model of the regression matrix corresponding to the minimum inertial parameter set of the hydraulic manipulator in the step 1 is specifically as follows:

$$\tau = Y(q,\dot{q},\ddot{q})*L$$

wherein $Y(q, \dot{q}, \ddot{q}) \in R^{n \times p}$ denotes the regression matrix, $L \in R^{p \times 1}$ denotes the minimum inertial parameter set, p denotes a count of elements in the minimum inertial parameter set, and $\tau$ denotes the hydraulic driving torque.

4. The terminal force soft-sensing method of the hydraulic manipulator according to claim 1, wherein
an expression of the finite Fourier series in the step 2 is as follows:

$$q_i(t) = \sum_{l=1}^{N} \left( \left( \frac{a_{l,i}}{\omega_f l} \sin(\omega_f l t) - \frac{b_{l,i}}{\omega_f l} \cos(\omega_f l t) \right) \right) + q_{i0}$$

for an i-th joint, a count of sine and cosine terms are both N, t denotes an operating time of the excitation trajectory, $\omega_f$ denotes a baseband and is specified as $2\pi f_f$, $f_f$ is specified as 1/t, and $a_{l,i}$, $b_{l,i}$, and $q_{i0}$ denote Fourier coefficients to be solved, which are solved based on a manner for finding out an optimal solution of a multivariate function with constraints; and in order to ensure that the hydraulic manipulator operates stably within a reachable safety range, the constraints are as follows:

$$\begin{cases} cond_{min}(Y) \\ q(0) = q_0, q(t_f) = q_0 \\ \dot{q}(0) = 0, \dot{q}(t_f) = 0 \\ \ddot{q}(0) = 0, \ddot{q}(t_f) = 0 \\ q_{min} \le q(t) \le q_{max} \\ \dot{q}_{min} \le \dot{q}(t) \le \dot{q}_{max} \\ \ddot{q}_{min} \le \ddot{q}(t) \le \ddot{q}_{max} \end{cases}$$

wherein $cond_{min}(Y)$ denotes taking the condition count of the regression matrix minimal as an optimization goal, and q(t) denotes a joint angle of the hydraulic manipulator at time t; $q_0$ denotes an initial joint angle of the hydraulic manipulator, when a cycle ends, t is specified as $t_f$, $t_f$ denotes an end moment, the hydraulic manipulator returns to the initial joint angle $q_0$ of the hydraulic manipulator to execute the next cycle continuously, and a velocity and an acceleration at an initial moment t (wherein t=0) and the end moment $t_f$ are set to 0 to effectively avoid an impact; $q_{min}$, $\dot{q}_{min}$, $\ddot{q}_{min}$, $q_{max}$, $\dot{q}_{max}$, and $\ddot{q}_{max}$ are respectively minimum and maximum values of an angle, an angular velocity, and an angular acceleration when the hydraulic manipulator moves; and the hydraulic manipulator is ensured to move within a safe range by setting an upper limit and a lower limit of the angle, the angular velocity, and the angular acceleration.

5. The terminal force soft-sensing method of the hydraulic manipulator according to claim 1, wherein the total regression matrix in the step 3 is determined based on a combination of regression matrices $Y_k$ at each moment, and k denotes a count of time interval points:

$$Y = [Y_1^T Y_2^T \ldots Y_k^T]^T.$$

6. The terminal force soft-sensing method of the hydraulic manipulator according to claim 1, wherein the hydraulic driving torque $\tau$ determined in the step 3 is as follows:

$$\tau_i = (P_{ai}A_{ai} - P_{bi}A_{bi})*r_i,$$

wherein i denotes a joint serial number, $P_{ai}$ and $P_{bi}$ respectively denote a pressure of a rodless chamber and a pressure of a rod chamber of the hydraulic cylinders, which are measured by the pressure sensors, $A_{ai}$ and $A_{bi}$ denote an area of the rodless chamber and an area of the rod chamber of the hydraulic cylinders, respectively, and $r_i$ is an effective power arm of the hydraulic cylinders.

7. The terminal force soft-sensing method of the hydraulic manipulator according to claim 1, wherein the minimum inertial parameter set L is determined based on a solution of the dynamic parameters of the hydraulic manipulator in the step 4 as follows:

$$L = (Y^T Y)^{-1} Y^T \tau.$$

8. The terminal force soft-sensing method of the hydraulic manipulator according to claim 1, wherein the terminal force of the hydraulic manipulator in the step 5 is solved as follows:

$$F = J_{qt}^T * (\tau_i - Y(q,\dot{q},\ddot{q})L)$$

wherein F denotes the terminal force of the hydraulic manipulator; $J_{qt}^T$ denotes a transposition of a Jacobian matrix of the hydraulic manipulator; $Y(q, \dot{q}, \ddot{q}) \in R^{n \times p}$ denotes the regression matrix, $L \in R^{p \times 1}$ denotes the minimum inertial parameter set, p denotes a count of elements in the minimum inertial parameter set, and n denotes a count of degrees of freedom of the hydraulic manipulator.

* * * * *